UNITED STATES PATENT OFFICE.

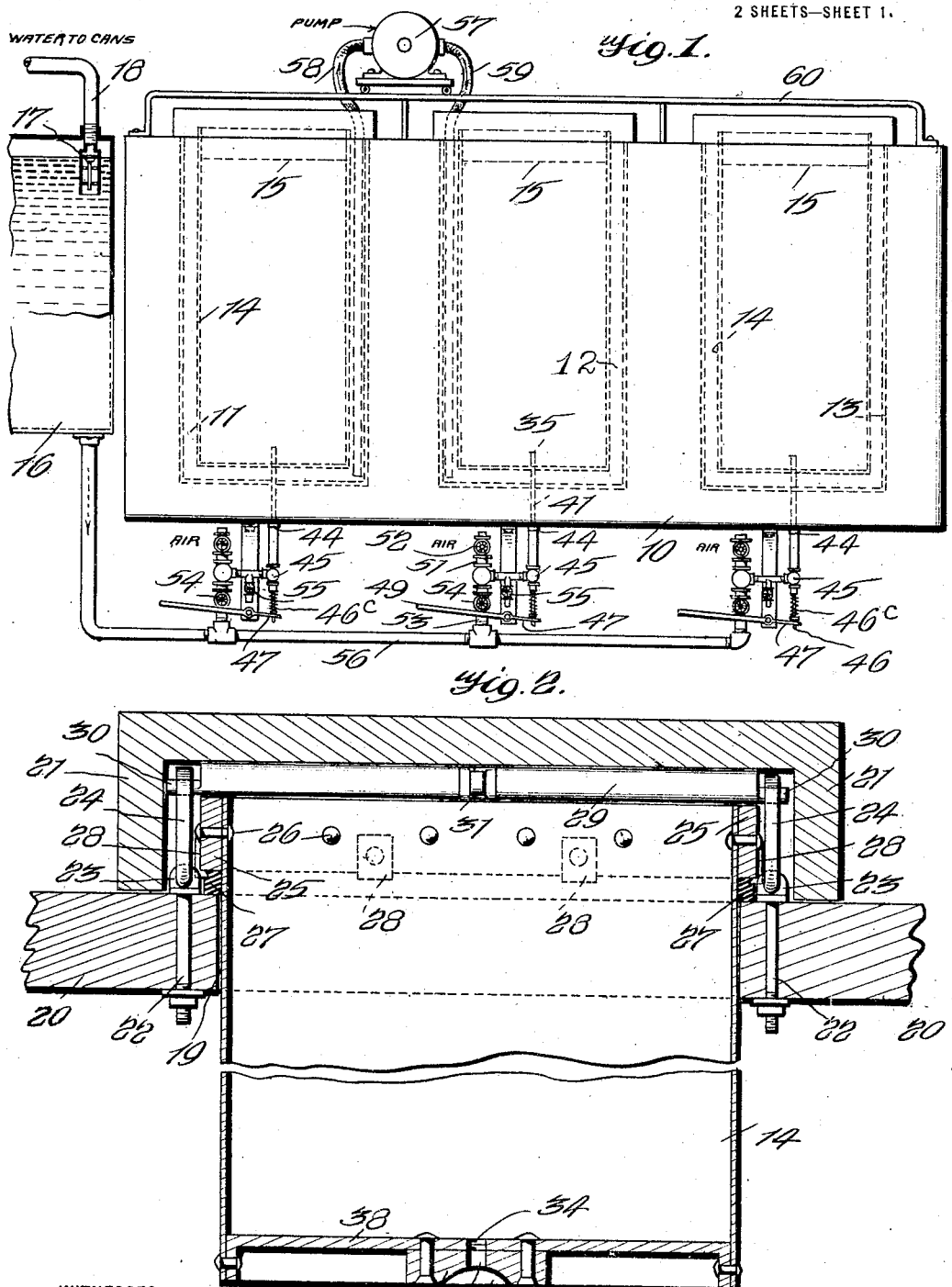

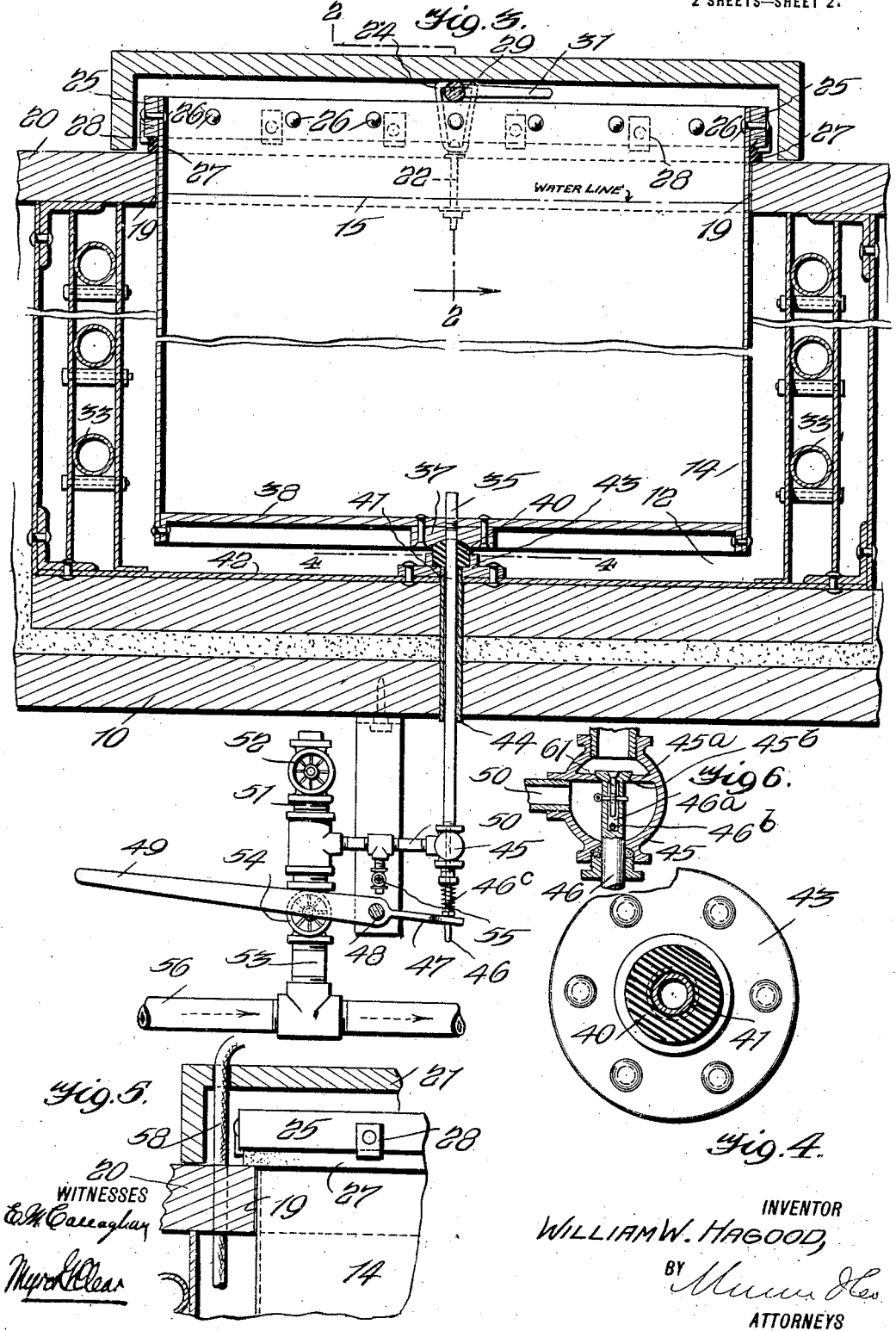

WILLIAM WARD HAGOOD, OF CHARLOTTE, NORTH CAROLINA.

SANITARY ICE-MAKING APPARATUS.

1,234,660.                Specification of Letters Patent.      Patented July 24, 1917.

Application filed December 7, 1916. Serial No. 135,646.

*To all whom it may concern:*

Be it known that I, WILLIAM W. HAGOOD, a citizen of the United States, and a resident of Charlotte, in the county of Mecklenburg and State of North Carolina, have invented a certain new and useful Improvement in Sanitary Ice-Making Apparatus, of which the following is a specification.

My present invention relates generally to ice-making apparatus, and more particularly to that type of apparatus employing tanks having compartments in which rows of cans are supported, surrounded by brine and ammonia or other coils, the cans being supplied with water which is frozen by the brine or cold air and freezing coils, the cans being removable from the compartments of the tanks for the purpose of dumping the blocks of ice formed therein.

The primary object of my present invention is to provide a highly efficient sanitary apparatus for the above purpose, the parts of which may be constantly inspected and maintained at small cost in perfect operating and cleanly condition.

A further object of my invention is to provide means whereby each can may be held in dependent position through its respective opening of the tank top, in such manner as to close the tank opening in air- and water-tight relation, and a still further object along the same line, is to provide such means for the purpose stated, as to prevent the disposition of the cover in proper place until the can has been properly secured.

A further object of my invention is the provision of means whereby each of the cans may be filled with water in the first instance, air fed thereto during the freezing operation, the slush core removed from the partly frozen block of ice, the core space refilled with distilled water, through a single connection with the can in the form of an inlet leading into the base of the can, through the base of the tank, whereby to obviate the necessity of filling the can from the top and utilizing separate aerating and slush-removing means as at present.

A still further object of my invention is to provide improved means whereby to remove the brine from one tank compartment to another so that the first compartment will be practically free of brine when the cans are removed for the dumping, and remain so until the cans are replaced, joints made, and the cans filled with water, so as to thus enable ready and complete inspection of the internal parts, and ready and easy adjustment, repair, and substitution.

With these and other objects residing for the most part in the details of the various features of my invention, all of which will be better understood from the following description in which reference is made to the accompanying drawings forming a part of this specification:

Figure 1 is an end view of a tank having a plurality of freezing compartments, in connection with a water supply tank from which the several cans of the freezing compartments are supplied;

Fig. 2 is a partial vertical section taken through a single can and a portion of the tank in a direction longitudinally of the latter, and substantially on line 2—2 of Fig. 3;

Fig. 3 is a vertical section taken transversely of the tank, through a portion thereof, and through a single can;

Fig. 4 is a detail horizontal section taken substantially on line 4—4 of Fig. 3;

Fig. 5 is a detail vertical section through a portion of the tank adjacent one end thereof, and Fig. 6 is a detail sectional view through one of the valves, as hereinafter described.

Referring now to these figures, and particularly to Fig. 1, the freezing tank is indicated generally at 10, with its several freezing compartments respectively at 11, 12, and 13, in each of which is located a longitudinal row or series of cans 14, 15 indicating the water line in the several cans, which are supplied with water from a water tank 16 having a float valve 17 in its feed pipe 18 arranged at the same level with the water level 15 of the several cans, so that when the water supply is turned on to any one of the several series of cans, water will flow thereinto until the level 15 is reached, when the flow will cease.

As seen by reference to Figs. 2 and 3, each of the cans 14 is let downwardly into its respective freezing compartment through an opening 19 of the tank top 20 and is covered by a cover 21 resting lightly upon the tank top in order to permit of outflow of air from the can 14 during the freezing operation, for a purpose to be presently described, it being noted that the tank top 20, at each side of the can 14, is provided with vertically extending bolts 22 having eyes 23 at their upper ends for the reception of upstanding links 24.

At the upper end thereof, each of the cans 14 is surrounded by a reinforcing bar 25, secured thereto by rivets or other suitable fastenings 26, and serving as both a reinforcement and as a bearing upwardly against which a gasket ring 27, surrounding the tank, is seated, this gasket being held in connection with the tank by means of clips 28 in order to prevent displacement of the same when the can is lifted out to dump a block of ice. When the can is placed in position, as shown in Figs. 2 and 3, the gasket ring 27 seats upon that portion of the tank top immediately surrounding its opening 19, the can being forced downwardly by means of an upper transversely extending cam shaft 29 having end trunnions 30 engaging the links 24, and having an intermediate handle 31 which is thrown into horizontal position when the cam shaft 29 is rotated to force the can downwardly and effect a water- and air-tight connection of the gasket ring 27 against the upper surface of the tank top 20, so as to prevent ingress and egress of air into and out of the space within the respective freezing compartment in which the can is disposed, and which freezing compartment receives the brine solution acted upon by the ammonia or other chemical coils 33, seen in Fig. 3.

It will be noted that the top of each of the cans 14 is open into the space inclosed by the loosely disposed cover 21, and that the bottom of the can is provided with a central opening 34 into which is threaded a short intake nipple 35 as seen in Fig. 3, the opening 34, seen in Fig. 2, communicating with the opening 36 of a bearing block 37 rigidly secured centrally of the can bottom 38 and having a concave bearing face 39 at the lower end of its opening to engage the upper convex face of a gasket ring 40 surrounding the upper portion of the combined intake and outlet pipe 41, the upper extremity of which projects into the opening 36 of the bearing block 37 when the can is in operative position within the tank compartment as seen in Fig. 3, the base of the tank compartment, seen at 42 in Fig. 3, being similarly provided with a bearing block 43 opposing the bearing block 37 and having a cavity in which the gasket 40 is seated around pipe 41. The pipe 41, as particularly seen in Fig. 3, depends through a sleeve 44 and is provided below the tank 10 with a manually controlled valve 45 having a depending stem 46 connected to an arm 47 extending from a rock shaft 48, movement of the latter of which is effected from a lever 49, these connections being such that the rock shaft 48 may be connected by a plurality of such arms 47 to the rod 46 of the valve of a row or series of cans 14 of one of the freezing tanks 11, 12, and 13.

The valve 45 connects its respective pipe 41 with a pipe 50, to which air is supplied from a pipe 51 under control of a valve 52, and to which water is supplied from a pipe 53 under control of a valve 54, the pipe 50 also having a valved outlet nipple 55.

The water pipe 53 leads from a water supply pipe 56 common to the several freezing tanks 11, 12, and 13, as seen in Fig. 1, and extending from the base of the water tank 16 before mentioned.

Thus, in operation, when the can is inserted downwardly into the opening 19 of the tank top 20, and onto the gasket 40, receiving the upper extremity of the pipe 41, and after the locking connections for the cam, including the cam shaft 29, have been operated so as to move the lever 31 to the horizontal position shown in Figs. 2 and 3 and thus permit the cover 21 to be placed in position, the valve 54 is opened, with the valve 52 and the valve nipple 55 closed, and then valve 45 opened by thrusting downwardly upon the lever 49, thus permitting the water from tank 16 to run into the can until the proper level 15 is reached, it being understood that this operation takes place in connection with all of the cans of a single series, that is, within one of the freezing compartments 11, 12, and 13.

When the level of water is reached the valve 54 is closed and, it being understood that brine is within the freezing compartment around the can and the ammonia or other freezing medium in circulation through the pipe 33, the air valve 52 is opened and with the valve 45 closed, air finds its way continuously during the freezing operation upwardly into the water within the can through the pipe 41 in a manner to be presently deescribed, so as to agitate the contents of the can and, as well known, reduce the core space in the center of the block of ice.

When the block has been frozen until nothing remains but the usual core space, which is filled with slush incapable of being frozen, the air valve 52 is closed and the valve 45 and the outlet nipple 55 opened, to permit the core slush to pass downwardly through pipe 41 and outwardly through the valve nipple 55. When the core slush has been exhausted from the core space of the block, the nipple 55 is closed and the water valve 54 opened so as to fill the core space with fresh water which is thereupon frozen within the core space to complete substantially a solid block.

When the block has been completely frozen, the valves 45 are all closed and, after the brine is removed from the freezing compartments around the several cans 14, the cover 21 is lifted off, the locking connections including the cam shaft 29, released and this shaft removed, and the can is then lifted out for the purpose of dumping the frozen block.

The removal of the brine from one freezing compartment and the discharge thereof into another compartment is preferably effected by means of a pump 57 as seen in Fig. 1, having flexible intake and outlet pipes 58 and 59 to be extended into the freezing compartment so as to withdraw the brine from one and discharge it into another, the pump 57 being adjustable upon a track 60 transversely above the tank 10, so as to conveniently reach the several freezing compartments 11, 12, and 13.

It is to be understood, of course, that the tank 10 may have any number of rows of freezing compartments, each occupied by one or more rows of cans 14, and it is to be further understood that the air forced through the contents of the can during the freezing operation, finds its way outwardly beneath the cover 21.

It is obvious, therefore, that when the several cans 14 of a series have been removed from their respective freezing compartments to dump the blocks of ice, the interior of that particular freezing compartment is open to view as to its condition from a sanitary standpoint as well as a mechanical standpoint, and that being free from brine, its several parts may be readily reached for purposes of cleansing, repair, or substitution.

It is also apparent that, by the provision of a single pipe at the bottom of each of the cans, for the supply of water and air as well as for the removal of the ore slush, considerable more or less bulky, expensive, and less effective means of filling, air supplying, and slush-withdrawing means, as ordinarily employed, are done away with.

It will be noted by reference to Fig. 6, that the valve 45 before referred to, includes a valve casing in which is an apertured web 45$^a$ forming the seat for the valve member 45$^b$, and that the upper end of stem 46 has an axial bore 46$^a$ and a laterally opening port 46$^b$ communicating between said bore and the interior of the casing 45$^a$. It will also be noted that a supplemental valve member 61 has limited movement in the bore 46$^a$ and seats centrally of the main valve member as shown, so that when the air valve 52 is open, air in just the proper amount, with the main valve member seated, finds its way through the port 46$^b$, bore 46$^a$, and supplemental valve 61.

By reference to Figs. 1 and 3 it will be noted that the main valves are normally held seated by springs 46$^c$ around their stems 46.

I claim:—

1. In ice making apparatus, the combination with a freezing tank having a top opening, of a can depending within said opening and having a gasket therearound for engagement with the upper surface of the tank top around its said opening, a pair of bearing members upstanding from the tank top at opposite sides of its opening, a cam shaft extending across and bearing downwardly upon the upper end of the can, said shaft having end trunnions engaging the said bearing members, and an intermediate handle for rotating the same to force the can gasket downwardly and against the tank top.

2. In ice making apparatus, the combination with a freezing tank having a top opening, of a can depending within said opening and having a gasket therearound for engagement with the upper surface of the tank top around its said opening, a pair of bearing members upstanding from the tank top at opposite sides of its opening, a cam shaft extending across and bearing downwardly upon the upper end of the can, said shaft having end trunnions engaging the said bearing members, an intermediate handle for rotating the same to force the can gasket downwardly and against the tank top, and a cover for disposition on the tank top around the upper open end of the can, the said shaft handle being movable to a horizontal operative position to permit the said cover to be placed in position.

3. In ice making apparatus, the combination with a freezing tank having a top opening, of a can depending within said opening, having a reinforcing bar surrounding its upper open end, and a gasket surrounding the can below said reinforcing bar for bearing upon the tank top around its said opening.

4. In ice making apparatus, the combination with a freezing tank having a top opening, of a can depending within said opening, having a reinforcing bar surrounding its upper open end, a gasket surrounding the can below said reinforcing bar for bearing upon the tank top around its said opening, and clips attached to the can and engaging the said gasket to hold the same in position when the can is removed from the tank.

5. In ice making apparatus, the combination with a freezing tank having a top opening, of a can depending within said opening having a reinforcing bar surrounding its upper open end, a gasket surrounding the can below said reinforcing bar for bearing upon the tank top around its said opening, and means for forcing the can downwardly in the opening whereby to press the gasket firmly against the tank top.

6. In ice making apparatus, the combination with a freezing tank having a top opening, of a can depending within said opening having a reinforcing bar surrounding its upper open end, a gasket surrounding the can below said reinforcing bar for bearing upon the tank top around its said opening, and means for forcing the can downwardly in the opening whereby to press the gasket firmly against the tank top, said means including a member engaging the upper open end of the can, and bearing elements secured to the tank top and with which said can engaging member is detachably connected.

7. In ice making apparatus, a freezing tank having a plurality of freezing compartments for the reception of brine, and means for withdrawing the brine from one compartment and discharging the same into another compartment, said means being shiftable between the several compartments.

8. In ice making apparatus, a freezing tank having a plurality of freezing compartments, and means shiftable along the upper portion of the tank above the several compartments, for withdrawing the brine from one compartment and discharging the same into another compartment.

9. In ice making apparatus, the combination with a freezing tank having a service pipe extending vertically through its base, of a can having a lower opening receiving the upper end of said service pipe, a water supply pipe having valved connection with said service pipe, and a water tank from which said supply pipe leads, having an inlet provided with a valve at the level of the water in the can.

10. In ice making apparatus, the combination with the freezing tank having a service pipe extending vertically through its base, of a can having a lower opening receiving the upper end of said service pipe, a manually controlled valve in the said service pipe, and valved air and water supply pipes and a valved outlet having connection with the said service pipe.

11. In ice making apparatus, the combination with the freezing tank having a service pipe extending vertically through its base, of a can having a lower opening receiving the upper end of the said service pipe, and valved air and water supply pipes and a valved outlet, having valved connection with said service pipe.

WILLIAM WARD HAGOOD.

Witnesses:
WILSON M. COSBY,
H. L. DAVENPORT.

Copies of this patent may be obtained for five cents each, by addressing the "Commissioner of Patents, Washington, D. C."